US012725031B2

(12) United States Patent
Bhose et al.

(10) Patent No.: US 12,725,031 B2
(45) Date of Patent: Sep. 1, 2026

(54) SYSTEM AND METHOD FOR IMPLEMENTING FEDERATED LEARNING ENGINE FOR INTEGRATION OF VERTICAL AND HORIZONTAL AI

(71) Applicant: Oracle International Corporation, Redwood Shores, CA (US)

(72) Inventors: Rajarshi Bhose, Bangalore (IN); Shahid Reza, Bengaluru (IN); Siddhant Jain, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 979 days.

(21) Appl. No.: 17/399,911

(22) Filed: Aug. 11, 2021

(65) Prior Publication Data

US 2023/0048920 A1 Feb. 16, 2023

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ........... G06N 3/08; G06N 3/045; G06N 3/098
See application file for complete search history.

(56) References Cited

U.S. PATENT DOCUMENTS

2016/0217387 A1 7/2016 Okanohara et al.
2021/0166111 A1* 6/2021 Knighton ............... G06N 3/045
2021/0192078 A1 6/2021 Cosman et al.
2021/0266383 A1 8/2021 Bito et al.
2021/0374503 A1* 12/2021 Kim ..................... G06N 3/0454
2021/0374947 A1 12/2021 Shin et al.
2021/0383272 A1 12/2021 Hua et al.
2022/0036202 A1 2/2022 Sivashanmugam et al.
2022/0245349 A1 8/2022 Pentyala et al.
2022/0277143 A1 9/2022 Jayarao et al.
2023/0068386 A1* 3/2023 Akdeniz ................ G06N 3/084

FOREIGN PATENT DOCUMENTS

WO 2021059604 A1 4/2021

OTHER PUBLICATIONS

Jiang, et al. "Bacombo—bandwidth-aware decentralized federated learning." (Year: 2020).*

(Continued)

*Primary Examiner* — Michelle T Bechtold
*Assistant Examiner* — Matiyas T Maru
(74) *Attorney, Agent, or Firm* — Kilpatrick Townsend & Stockton LLP

(57) ABSTRACT

Systems and methods for implementing federated learning engine for integration of vertical and horizontal AI are disclosed herein. A method can include receiving a global model from a central aggregator communicatingly connected with a plurality of user environments, which global model including a plurality of layers. The method can include training a mini model on top of the global model with data gathered within the user environment, uploading the at least a portion of the mini model to the central aggregator, receiving a plurality of mini models, and creating a fusion model based on the received plurality of mini models.

18 Claims, 12 Drawing Sheets

(56) References Cited

OTHER PUBLICATIONS

Khan, et al. “Federated learning for internet of things: Recent advances, taxonomy, and open challenges.” (Year: 2021).*
Ge et al., “Fedner: Privacy-preserving medical named entity recognition with federated learning.” (Year: 2020).*
Ye, et al., “Federated learning in vehicular edge computing: A selective model aggregation approach.” (Year: 2020).*
Nguyen et al., “Federated learning for internet of things: A comprehensive survey.” (Year: 2021).*
International Application No. PCT/US2022/034223 , “International Preliminary Report on Patentability”, Feb. 22, 2024, 9 pages.
International Search Report and Written Opinion dated Oct. 10, 2022 for International Application No. PCT/US2022/034223, 11 pages.
Bonawitz et al., Practical Secure Aggregation for Privacy-Preserving Machine Learning, Proceedings of the 2017 ACM SIGSAC Conference on Computer and Communications Security, Available Online at: https://eprint.iacr.org/2017/281, Oct. 30, 2017, 21 pages.
Mcmahan et al., Federated Learning: Collaborative Machine Learning without Centralized Training Data, Google AI Blog, Available Online at: https://ai.googleblog.com/2017/04/federated-learning-collaborative.html, Apr. 6, 2017, 4 pages.
U.S. Appl. No. 17/488,289, Non-Final Office Action, mailed on Dec. 2, 2024, 28 pages.
Duan et al., “Fast MPEG-CDVS Encoder with GPU-CPU Hybrid Computing”, Institute of Electrical and Electronics Engineers Transactions on Image Processing, May 2017, 14 pages.
International Application No. EP22741936.3, Office Action, mailed Dec. 20, 2024, 11 pages.
Ganesh et al., “Compressing Large-Scale Transformer-Based Models: A Case Study on BERT”, Transactions of the Association for Computational Linguistics, vol. 9, Jun. 2021, pp. 1061-1080.
International Application No. JP2024-508479, Notice of Decision to Grant, mailed on Mar. 3, 2026, 5 pages.
U.S. Appl. No. 17/488,289, “Final Office Action”, mailed Aug. 11, 2025, 27 pages.
Yang et al., “Federated Machine Learning: Concept and Applications”, Available Online at: https://arxiv.org/pdf/1902.04885, Feb. 13, 2019, 19 pages.
U.S. Appl. No. 17/488,289, “Non-Final Office Action”, mailed on Apr. 1, 2026, 27 pages.
Pati et al., “Demystifying BERT: Implications for Accelerator Design”, Available online at: https://arxiv.org/abs/2104.08335, Apr. 14, 2021, 17 pages.

* cited by examiner

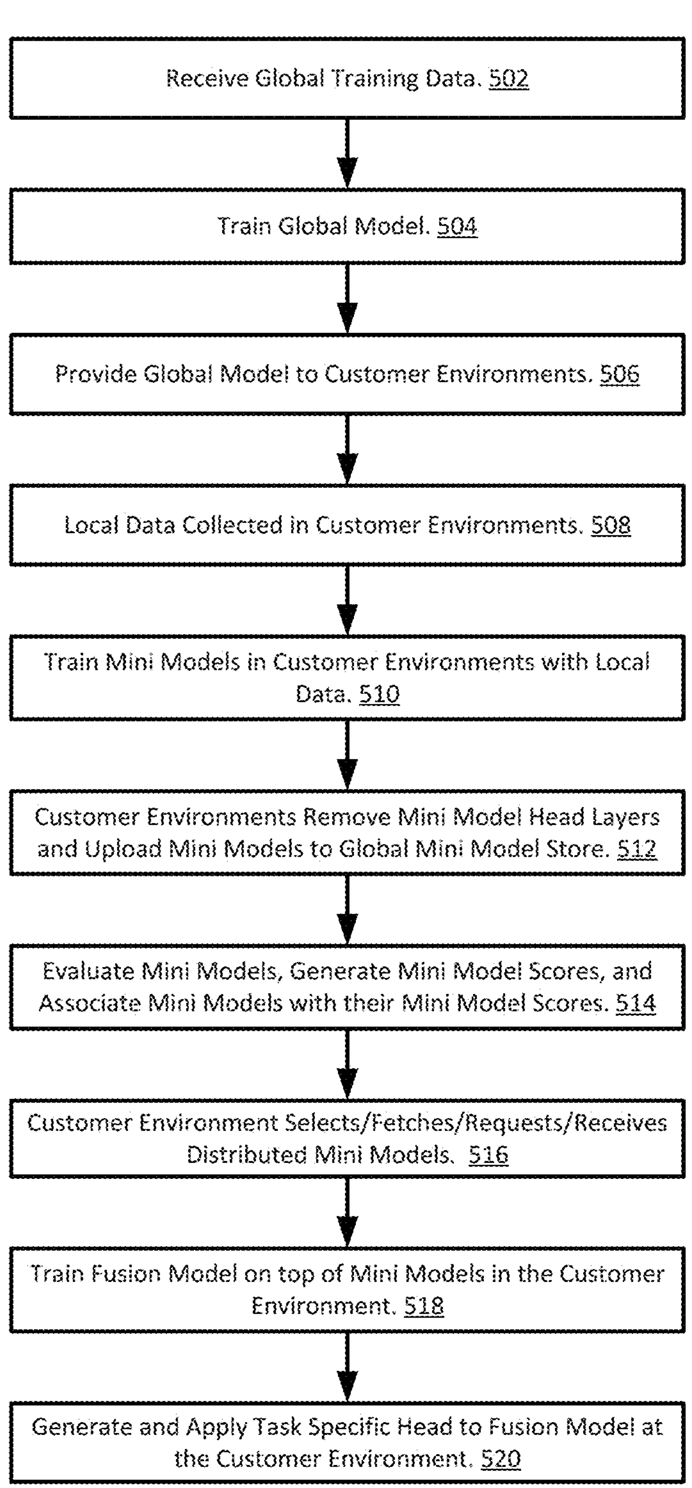
*FIG. 5*

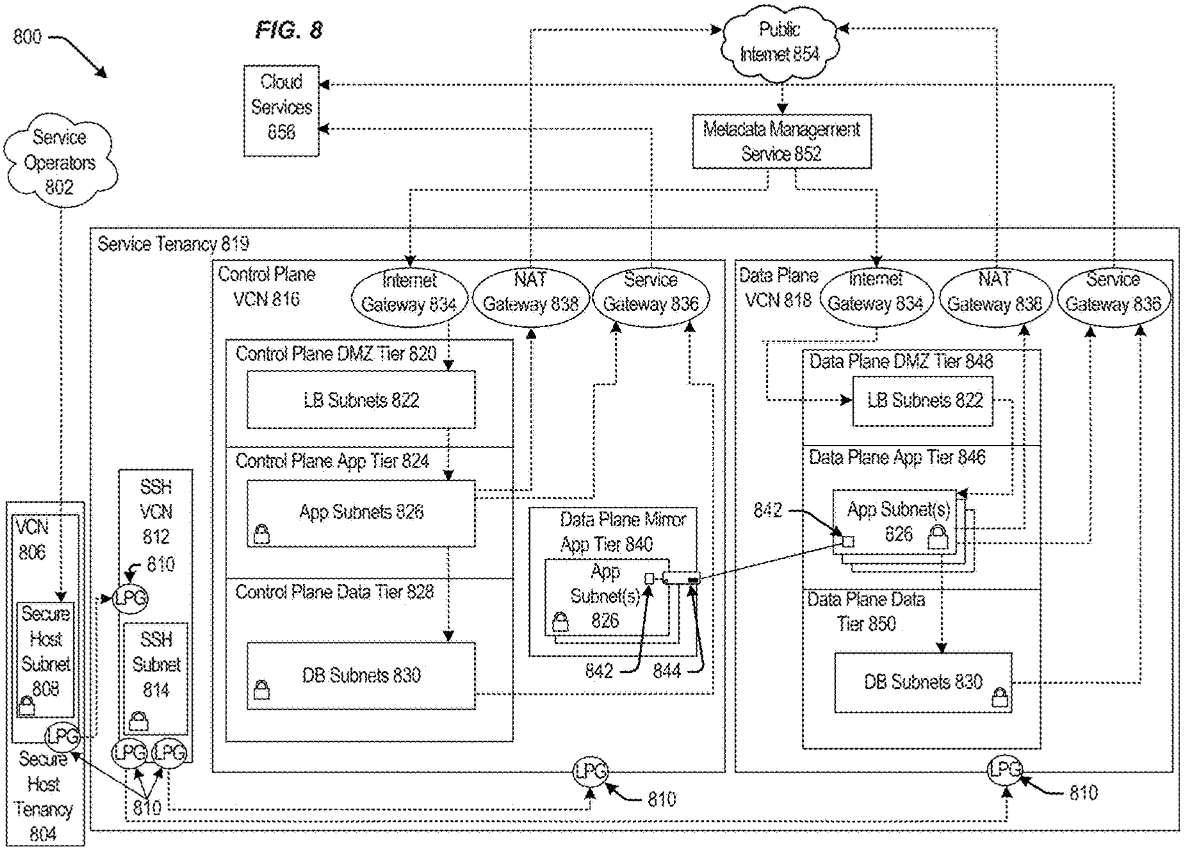
800
FIG. 8
Public Internet 854
Cloud Services 856
Metadata Management Service 852
Service Operators 802
Service Tenancy 819
Control Plane VCN 816
Internet Gateway 834
NAT Gateway 838
Service Gateway 836
Data Plane VCN 818
Internet Gateway 834
NAT Gateway 838
Service Gateway 836
Control Plane DMZ Tier 820
LB Subnets 822
Control Plane App Tier 824
App Subnets 826
Control Plane Data Tier 828
DB Subnets 830
Data Plane Mirror App Tier 840
App Subnet(s) 826
842
844
Data Plane DMZ Tier 848
LB Subnets 822
Data Plane App Tier 846
842
App Subnet(s) 826
Data Plane Data Tier 850
DB Subnets 830
SSH VCN 812
810
LPG
SSH Subnet 814
VCN 806
Secure Host Subnet 808
LPG
Secure Host Tenancy 804
LPG
LPG
810
LPG
810
LPG
810

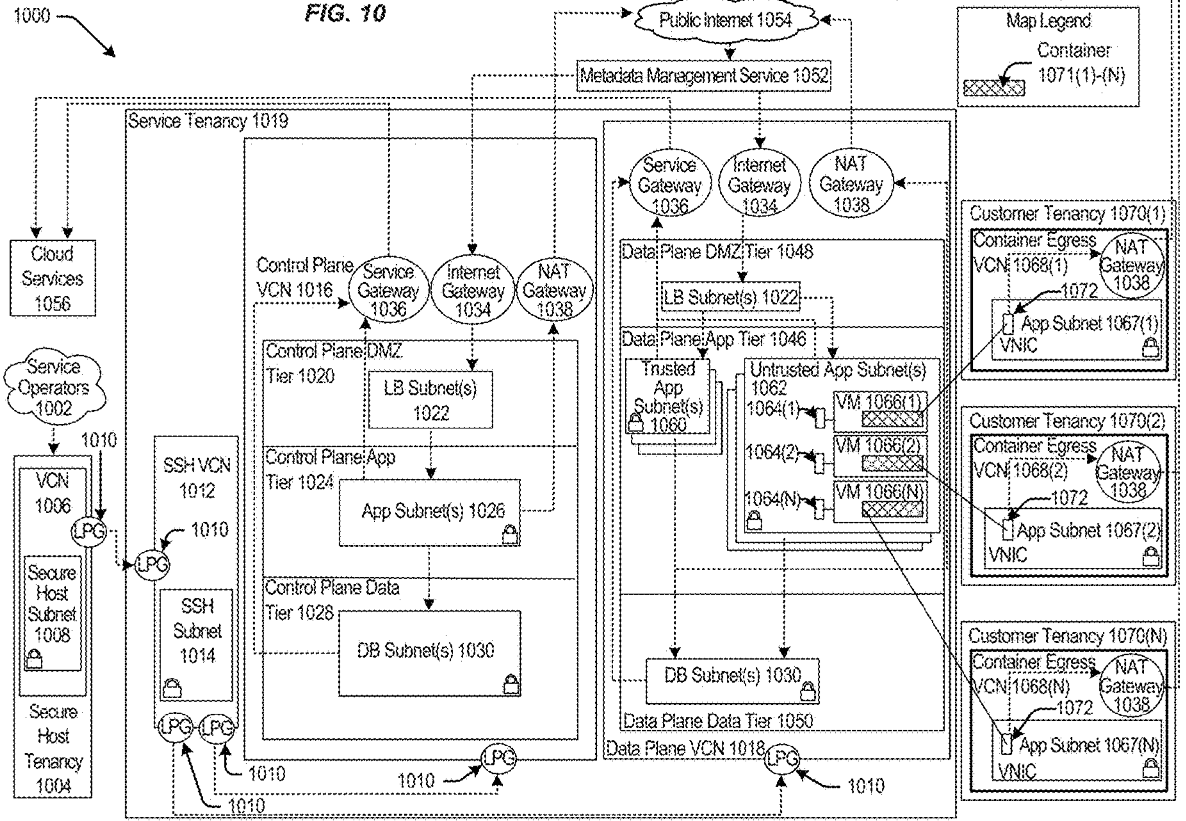

1000
FIG. 10
Public Internet 1054
Map Legend
Container 1071(1)-(N)
Metadata Management Service 1052
Service Tenancy 1019
Cloud Services 1056
Service Gateway 1036
Internet Gateway 1034
NAT Gateway 1038
Customer Tenancy 1070(1)
Container Egress VCN 1068(1)
Control Plane VCN 1016
Data Plane DMZ Tier 1048
LB Subnet(s) 1022
App Subnet 1067(1)
VNIC
1072
Control Plane DMZ Tier 1020
Data Plane App Tier 1046
Service Operators 1002
Trusted App Subnet(s) 1060
Untrusted App Subnet(s) 1062
VM 1066(1)
VM 1066(2)
VM 1066(N)
1064(1)
1064(2)
1064(N)
Customer Tenancy 1070(2)
Container Egress VCN 1068(2)
App Subnet 1067(2)
1010
VCN 1006
SSH VCN 1012
Control Plane App Tier 1024
App Subnet(s) 1026
LPG
Secure Host Subnet 1008
SSH Subnet 1014
Control Plane Data Tier 1028
DB Subnet(s) 1030
Customer Tenancy 1070(N)
Container Egress VCN 1068(N)
App Subnet 1067(N)
Secure Host Tenancy 1004
Data Plane Data Tier 1050
Data Plane VCN 1018

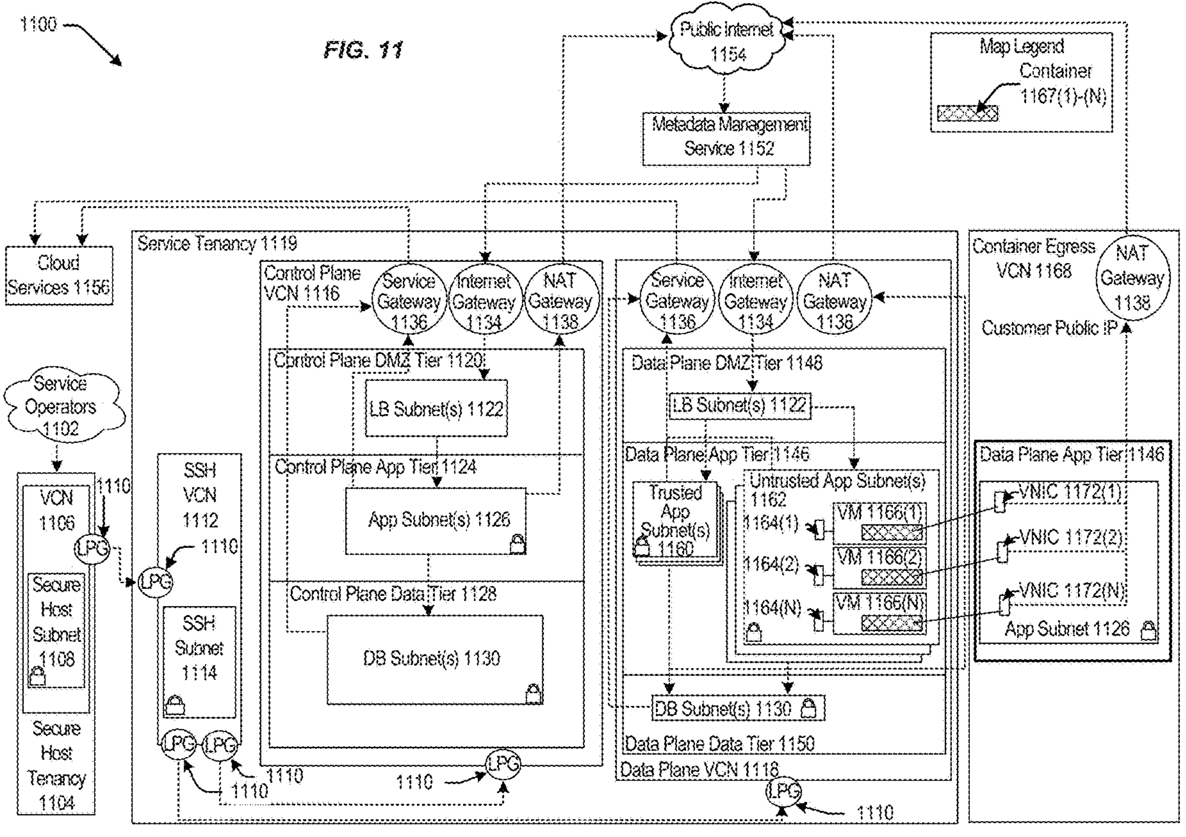
1100
FIG. 11
Public Internet 1154
Map Legend
Container 1167(1)-(N)
Metadata Management Service 1152
Cloud Services 1156
Service Tenancy 1119
Control Plane VCN 1116
Service Gateway 1136
Internet Gateway 1134
NAT Gateway 1138
Container Egress VCN 1168
Customer Public IP
Service Operators 1102
Control Plane DMZ Tier 1120
LB Subnet(s) 1122
Data Plane DMZ Tier 1148
Control Plane App Tier 1124
App Subnet(s) 1126
Data Plane App Tier 1146
Trusted App Subnet(s) 1160
Untrusted App Subnet(s) 1162
VM 1166(1)
VM 1166(2)
VM 1166(N)
1164(1)
1164(2)
1164(N)
VNIC 1172(1)
VNIC 1172(2)
VNIC 1172(N)
App Subnet 1126
VCN 1106
LPG
1110
SSH VCN 1112
Secure Host Subnet 1108
SSH Subnet 1114
Control Plane Data Tier 1128
DB Subnet(s) 1130
Data Plane Data Tier 1150
Data Plane VCN 1118
Secure Host Tenancy 1104

SYSTEM AND METHOD FOR IMPLEMENTING FEDERATED LEARNING ENGINE FOR INTEGRATION OF VERTICAL AND HORIZONTAL AI

BACKGROUND

This application relates to distributed machine learning and federated learning.

BRIEF SUMMARY

One aspect of the present relates to a method. The method includes receiving a global model from a central aggregator communicatingly connected with a plurality of user environments, the global model including a plurality of layers, training a mini model on top of the global model with data gathered within the user environment, uploading the at least a portion of the mini model to the central aggregator, receiving a plurality of mini models, and creating a fusion model based on the received plurality of mini models.

In some embodiments, the plurality of user environments include a plurality of tenancies within of a cloud computing network. In some embodiments, the global model can be a deep-learning model. In some embodiments, the deep-learning model can be a transformer. In some embodiments, the deep-learning model can be a Bidirectional Encoder Representations from Transformers (BERT) model.

In some embodiments, the min model can ingest outputs of the global model. In some embodiments, the outputs of the global model include layer outputs of at least some of the layers of the global model. In some embodiments, uploading the mini model to the central aggregator includes stripping the mini model of a classifier head. In some embodiments, uploading the mini model to the central aggregator includes uploading binary of the mini model.

In some embodiments, the plurality of mini models are received from the central aggregator. In some embodiments, creating the fusion model based on the received plurality of mini models includes training the fusion model on top of the received mini models. In some embodiments, creating the fusion model based on the received plurality of mini models includes combining data representing layers and weights from each of the plurality of mini models.

In some embodiments, creating the fusion model based on the received plurality of mini models includes generating a classifier head, and applying the classifier head to layers of the fusion model. In some embodiments, the method includes receiving data for use in generation of a machine learning model output, ingesting the data with the global model at the user environment, gathering intermediate outputs of the global model, ingesting the intermediate outputs with the fusion model, and outputting a prediction with the fusion model. In some embodiments, the method includes receiving data for use in generation of a machine learning model output, ingesting the data with the global model at the user environment, gathering first intermediate outputs of the global model, ingesting the first intermediate outputs of the global model with at least some of the plurality of mini models, gathering second intermediate outputs of the at least some of the plurality of mini models, ingesting the intermediate outputs with the fusion model, and outputting a prediction with the fusion model.

One aspect of the present relates to a system including a memory and at least on processor. The at least one processor can receive a global model from a central aggregator communicatingly connected with a plurality of user environments, the global model including a plurality of layers, train a mini model on top of the global model with data gathered within the user environment, upload the at least a portion of the mini model to the central aggregator, receive a plurality of mini models, and create a fusion model based on the received plurality of mini models.

In some embodiments, uploading the at least the portion of the mini model to the central aggregator includes stripping the mini model of a classifier head. In some embodiments, creating the fusion model based on the received plurality of mini models includes training the fusion model on top of the received mini models.

One aspect of the present relates to a non-transitory computer-readable storage medium storing a plurality of instructions executable by one or more processors. When executed by the one or more processors, the plurality of instructions cause the one or more processors to receive a global model from a central aggregator communicatingly connected with a plurality of user environments, the global model including a plurality of layers, train a mini model on top of the global model with data gathered within the user environment, upload the at least a portion of the mini model to the central aggregator, receive a plurality of mini models, and create a fusion model based on the received plurality of mini models.

In some embodiments, uploading the at least the portion of the mini model to the central aggregator includes stripping the mini model of a classifier head. In some embodiments, creating the fusion model based on the received plurality of mini models includes training the fusion model on top of the received mini models.

BRIEF DESCRIPTION OF THE DRAWINGS

FIG. 5 is a flowchart illustrating one embodiment of a process for generating a fusion model.

FIG. 8 is a block diagram illustrating one pattern for implementing a cloud infrastructure as a service system, according to at least one embodiment.

FIG. 10 is a block diagram illustrating another pattern for implementing a cloud infrastructure as a service system, according to at least one embodiment.

FIG. 11 is a block diagram illustrating another pattern for implementing a cloud infrastructure as a service system, according to at least one embodiment.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

System of Intelligence

Figure 1:
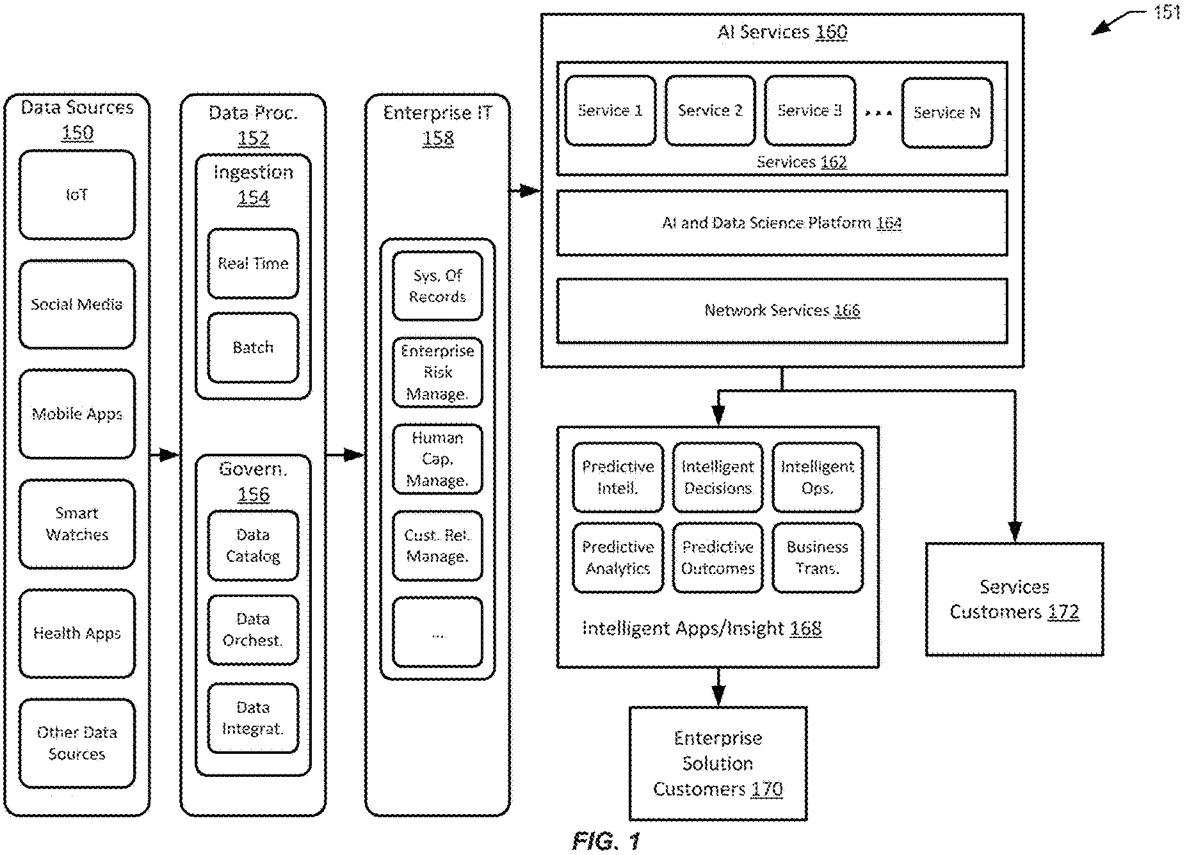
FIG. 1 is a schematic illustration of one embodiment of aspects of the AI

With reference now to FIG. 1, a schematic illustration of one embodiment of aspects of a system of intelligence 151 is shown. The system of intelligence 151 depicts the connection between data sources 150, data processing 152, enterprise IT 158, AI services 160, Intelligent Apps/Insight module 168, and enterprise solution customers 170 or services customers 172. In some embodiments, the aspects of the system of intelligence 151 can gather data, can train a model, and can provide the model and/or outputs of that model to one or several customers.

The system of intelligence 151 includes data sources 150. The data sources can include and source of data used by the system of intelligence 151. These can include, for example, Internet-of-things devices, social media, mobile apps, smart watches, health apps, or any other data source.

Data gathered from the data sources 150 can be provided to the data processing module 152. This can include an ingestion submodule 154 which can provide, for example, real-time and/or batch ingestion, and/or to a data governance module 156. The governance module 156 can provide data cataloging, data orchestration, and/or data integration.

The data processing module 152 can be connected to enterprise IP 158, which can provide a system of records, enterprise risk management, human capital management, customer relationship management, or the like. The enterprise IT 158 can connect to AI services 160, which can include a services module 162 comprising one or several services. Each of these one or several services represent an AI capability. These can include, for example, computer vision, speech translation, anomaly detection, language services, forecasting service, federated AI services, or the like.

The services in the services module 162 can each be a customer end point that will enable customers to use both pre-trained and custom models Intelligence delivered via AI services 160. The services module 162 can include services identified above, and can include newer services as these newer services are developed and productionised.

AI services 160 can include the AI and Data Science platform 164. The AI and data science platform 164 can provide infrastructure and capabilities to support running of machine learning and data workloads. This can include, for example, model training support, inferencing support, or the like. In some embodiments, the platform 164 can include an orchestration layer that can be a collection of functionality that encapsulates both the ML Infra and Services layers from the complexities and idiosyncrasies of those layers for ease of consumption and management within the AI Service logic. This layer can include, for example, an asset manager, a training manager, a deployment manager and/or a orchestration manager.

The network services 166 can provide the infrastructure resources that can be used by an individual AI Service across multiple AI Services customers, or shared by multiple AI Services across multiple AI Services customers. Multiple AI Services can share dedicated ML infrastructure resources for a specific AI Services customer if such security and privacy isolation is requested by that AI Services customer. The common infrastructure required are compute (CPU/GPU), Network, Storage.

The system 151 further includes intelligent apps/insight module 168. The apps in this module can, for example, enable faster time-to-business insights, acceleration of processes, increased time to market, and improved customer experiences. In some embodiments, these can further reduce costs and improve productivity. In some embodiments, this can be achieved without use of data scientists or IT.

The system 151 can interact with customers 170, 172 is directly via AI services 160, or via the intelligent apps/insight module 168.

Federated Learning Engine

Many machine learning approaches utilize centralized training data. This training data can be, for example, centralized within a data center or within one or several machines. Such data centralization has proven effective, however, there can be several downsides to such centralization. These downsides include issues arising from the collection and/or management of data containing personal, protected, and/or confidential information. Further, the aggregation of large amounts of data can require large amounts of hardware and the associated costs of such hardware. Finally, due to issues relating to catastrophic forgetting, large and growing aggregations of training data may not result in better performance of the machine learning model.

This issues become particularly challenging when using an artificial intelligence model for multiple distinct markets. For example, a single AI model may struggle to work effectively in both medical markets and hospitality markets. For such a model to work equally well in both markets, the model cannot include market specific training as this could lead to catastrophic forgetting of training relevant to the other market. Thus, many such models lack specific training necessary to provide high-level performance.

For example, a horizontal AI model can be non-specific to one or several industry domains. This horizontal AI model can solve a broad range of problems across many different industries, and in some embodiments, can provide a use case agnostic program. In some embodiments, the horizontal AI can be used to prioritize customer leads, predict which recruit will be most successful, recommend products, or target advertising. Vertical AI can be specific to an industry vertical, and can be applied to a specific problem in a specific industry that can be, for example, highly optimized for that industry. Vertical AI application can utilize industry-specific types of data from a target industry to train a model. In some embodiments the inferences from vertical AI can provide unique and improved predications and/or insights.

In some embodiments, combination of horizontal and vertical AI as disclosed herein can enable solving of a broad range of problems, and in some embodiments, can help customer choose data to build an AI vertical. In some embodiments, the present disclosure can facilitate in rapidly training, generating, and/or placing AI Models into production using vastly heterogeneous data from multiple sources. The embodiments disclosed herein can, for example, accelerate in rapid prototyping industry-specific models with vertical differentiation in a particular industry domain The embodiments disclosed herein can enable use of model learning to optimize infrastructure costs for model training and deployment.

In one specific embodiment disclosed herein, horizontal AI in the form of an initial global model can be used in combination with vertical AI in the form of one or several mini models and/or fusion models. Via the combination of the horizontal and vertical AI as disclosed herein, the benefits of both horizontal AI and vertical AI can be, in some embodiments, simultaneously achieved. In some embodiments, the global model can, over time, be updated based on the mini models and/or based on the fusion models and, thus, over time, the global model can become vertical AI due to these updates. This targeted vertical model can then be stored and utilized to provide vertical specific AI without further federated learning.

Further, the present disclosure relates to systems and methods of federated learning. In such systems and methods, a global model is centrally trained and provided to different customers also referred to herein as users. These users can install and utilize this global model, and based on data collected by these user, a supplemental machine learning model, also referred to herein as a mini model, can be trained. This supplemental machine learning model can, in some embodiments, receive one or several outputs of the global model as inputs, for example, inter-layer outputs of the global model. Based on these inputs from the global model and/or on other inputs, the supplemental model can generate outputs.

Such supplemental models can be provided to a central server, which can store these supplemental models. These supplemental models can be provided to the central server by first stripping their classifier head, and then sending the stripped supplemental model to the central server. In some embodiments, a supplemental models can be sent to the central server in binary form, which binary can identify the layers and/or the nodes of the supplemental model, and the weights associated with the layers and/or nodes of the supplemental model.

These supplemental models can be received from several of the users to which the global model was provided, and in aggregator can create a library of supplemental models. A user can request one or several supplemental models and/or can be provided with one or several supplemental models. Some or all of these one or several supplemental models can be used in the creation of a fusion model. In some embodiments, the fusion model can be created from a combination of the supplemental models and/or the fusion model can be trained on top of the supplementary models. In some embodiments, the fusion model can incorporate the data from the mini models, and specifically can include layers and/or nodes, and their associated weights from the mini models.

By using a pre-trained global model combined with mini models, user can quickly incorporate changes and/or updates, and users are able to customize a model for the specific application without the risks of, for example, catastrophic forgetting. Further, users can select mini models for inclusion in their fusion model. These mini models can be selected based on information associated with the mini models, which information can include metadata relating to the mini models. In some embodiments, this metadata can indicate the source of the mini model, a trust level and/or accuracy of the mini model, and/or other information relevant to the mini model. The user can, based on this information, determine if they trust a mini model and/or can select one or several mini models for inclusion in their fusion model.

In operation, when a user desires to a make a prediction with their fusion model, the user can receive and/or select data, such as feature data. This data can be ingested by the global model in the user environment. Intermediate outputs of the global model, which outputs can include inter-layer outputs, can be gathered by the user. These intermediate outputs of the global model can be features for ingestion into a next machine learning model. In some embodiments, this next machine learning model can be the mini models from which the fusion model is created. In such an embodiment, the intermediate outputs of the mini models, which outputs can include inter-layer outputs, can be gathered by the user. These intermediate outputs of the mini models can be features for ingestion into the fusion model.

Some or all of the features of the global model and/or of the mini models from which the fusion model is created can be ingested by the fusion model. The fusion model, which can include a classifier head, can generate an output, which can be a final output. This output can be a prediction, a classification, and/or the like.

Figure 2:
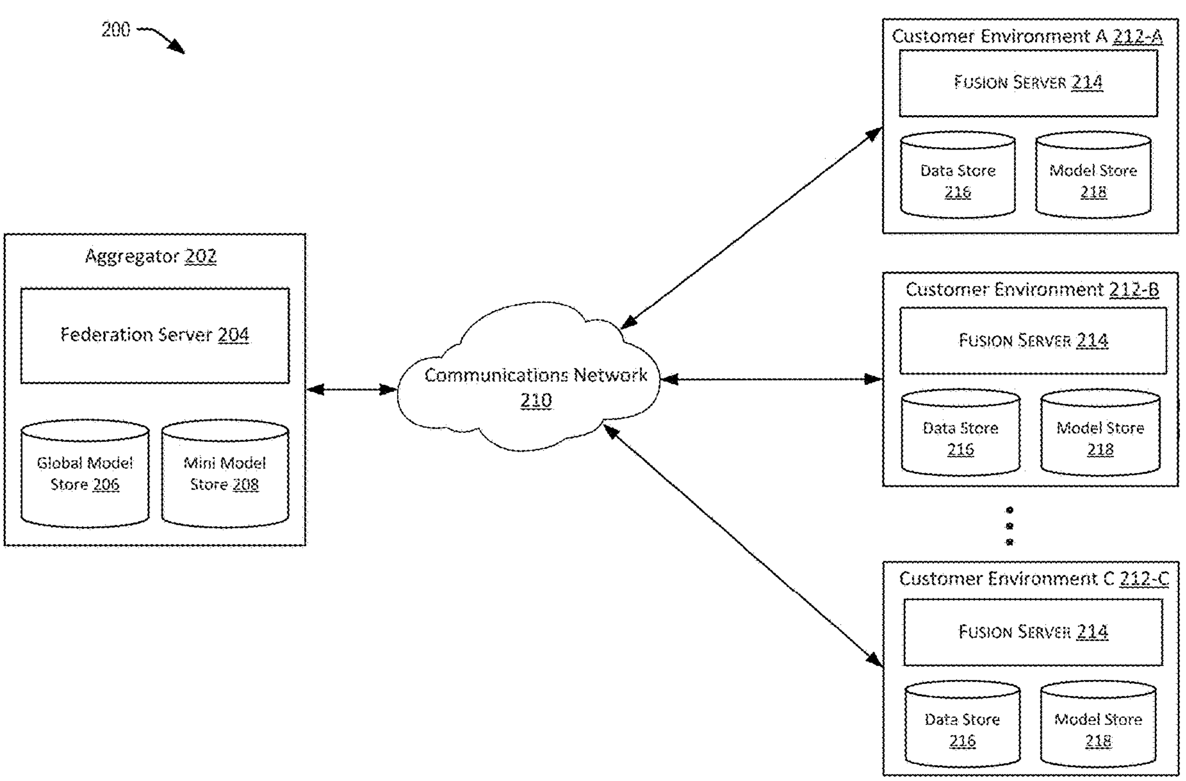
FIG. 2 is a schematic illustration of one embodiment of a federated learning system.

With reference now to FIG. 2 a schematic illustration of one embodiment of a federated learning system 200 is shown. The federated learning system 200 can include an aggregator 202 and one or several customer environments 212. Each of the aggregator 202 and the one or several customer environments 212 can comprise hardware, or can comprise a virtual instance. Thus, in some embodiments, each of the aggregator 202 and the one or several customer environments 212 can comprise one or several processors, servers, computers, or the like, or alternatively, can comprise a virtual compute instance. In some embodiments, all of the aggregator 202 and the one or several customer environments 212 comprise virtual instances such as, for example, on a virtual cloud network. In some embodiments, the aggregator and the one or several customer environments 212 can run as distinct tenancies within a cloud network. In some embodiments, each of the one or several customer environments 212 can have access to private data of their associated customer, whereas the aggregator 202 does not, in some embodiments, have access to this private data of the customers.

The aggregator 202 and each of the customer environments can, in some embodiments, be communicatingly linked via a communications network 210. The communications network 210 can enable communication and/or data transfer amongst the aggregator 202 and the one or several customer environments 212. In some embodiments, the communications network 210 can comprise a wired or wireless network, a local area network, a wide area network, a public network, a private network, or the like.

The aggregator 202 can gather and manage information. This can include information identifying, for example, one or several customers, a current state of processing, logging and monitoring information, or the like. In some embodiments, the aggregator 202 manages information to thereby facilitate in the gathering, averaging, and distribution of mini models. In some embodiments, the aggregator 202 can further train and/or update training of the global model.

The aggregator 202 can include a federation server 204. The federation server 204 can be embodied in hardware or in software. The federation server 204 can generate and/or train a global model, can provide the global model to one or several customer environments 212, can receive mini models from the one or several customer environments 212, can manage the storage and tracking of the mini models, can generate and/or gather metadata relevant to the mini models, and can provide one or several mini models to the one or several customer environments 212. The federation server 204 can be embodied in hardware or in software. In some embodiments, the federation server 204 can comprise a virtual compute instance and/or service provided as a part of a virtual cloud network.

The aggregator can include a global model store 206. The global model store 206 can store the global model. In some embodiments, this can include storing metadata relevant to the global model. This metadata can include, for example, a version, a training data or the like. The global model store 206 can comprise a database and/or memory. This memory can include an allocated portion of a memory, or can include one or several discrete memory devices.

The global model can be a base model. The global model can comprise, for example, a Neural Network, a Decision Tree, a Linear Classifier/Regression, a deep learning model, a Deep Reinforcement Learning model such as, for example, Deep Deterministic Policy Gradients (DDPG) or Deep Q Network (DQN), or the like. In some embodiments, the global model can comprise a transformer such as, for example, a Bidirectional Encoder Representations from Transformers (BERT) model. The global model can be trained by the aggregator, and specifically by the federation server. In some embodiments, the global model can be trained for feature extraction. In some embodiments, for example, the global model can be trained for feature extraction from a given text. These features can include, for example, linguistic and/or context features. In some embodiments, the global model can be trained using data accessible by the aggregator 202, including training data in the global model store 206.

The aggregator can include a mini model store 208, also referred to herein as a supplemental model store 208 or as a local model store 208. The mini model store 208 can store one or several mini models. The mini model store 208 can store binary of the mini models, which binary can represent the layers, nodes, and/or weights of the mini model. The mini model store 208 can stored, in some embodiments, metadata relevant to the mini models. This metadata can include, for example, identification of the source of the mini model, information for establishing and/or evaluation trustworthiness of the validity model, information relating to the training of the validity model, or the like. In some embodiments, information relating to the training of the validity model can identify tasks for which the validity model was trained, and/or the specific vertical for which the validity model was trained. The mini model store 208 can comprise a database and/or memory. This memory can include an allocated portion of a memory, or can include one or several discrete memory devices.

Each of the customer environments 212 can include a fusion server 214. The fusion server 214 can receive the global model from the aggregator 202, can store the global model, can generate a mini model on top of the global model, can send the global model to the aggregator 202 for storage in the mini model store 208, can receive one or several mini models and/or updates from the aggregator 202, can train and/or build a fusion model based on these received one or several mini models and/or updates from the aggregator 202, and can use the mini model and/or the global model to generate one or several outputs and/or predictions. The fusion server can 214 be embodied in hardware or in software. In some embodiments, the fusion server 214 can comprise a virtual compute instance and/or service provided as a part of a virtual cloud network.

The customer environment 212 can include a data store 216. The data store 216 can store customer information of the customer associated with the customer environment. In some embodiments, this customer information can be private and can be stored such that this customer information is not accessible by the aggregator 202 and/or by any other customer environment 212. The customer information in the data store 216 can be used in training the mini model and in training the fusion model. The data store 216 can comprise a database and/or memory. This memory can include an allocated portion a memory, or can include one or several discrete memory devices.

The customer environment 212 can include a model store 218. The model store 218 can, in some embodiments, store the mini model trained by the customer environment 212 on top of the global model, and in some embodiments, can store the fusion model generated and/or trained by the customer environment 212 on top of the received mini models. The model store 218 can, in some embodiments, further store the global model received by the customer environment 212 from the aggregator 202. The model store 218 can comprise a database and/or memory. This memory can include an allocated portion a memory, or can include one or several discrete memory devices.

Figure 3:
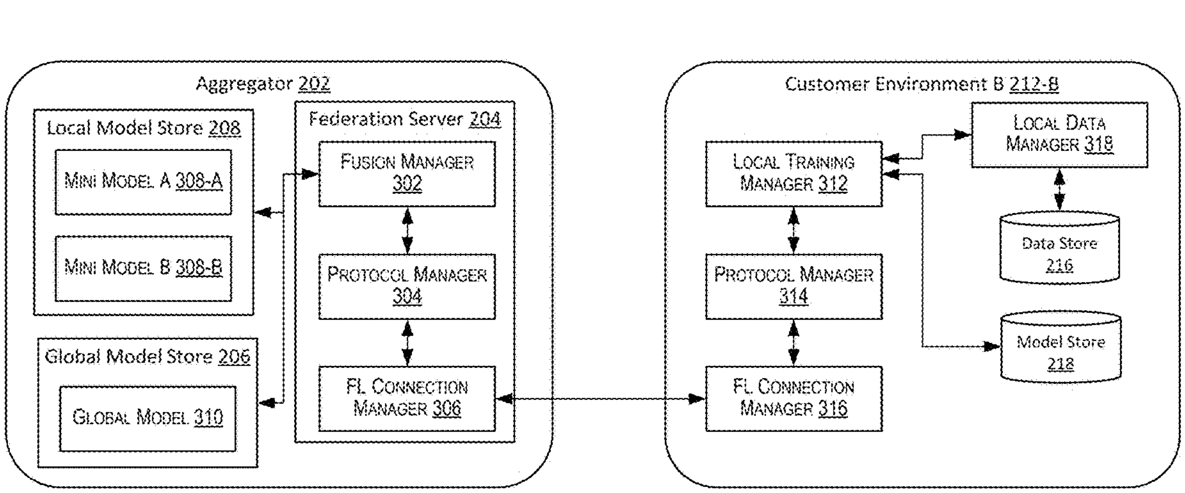
FIG. 3 is a detailed schematic illustration of one embodiment of the federated learning system.

With reference now to FIG. 3, a detailed schematic illustration of one embodiment of system 200 is shown. In some embodiments, the system 200 can provide a framework for federated learning. The system includes the aggregator 202 and one customer environment 212. As shown in FIG. 2, the system 200 can include multiple additional customer environments 212, but for purposes of providing greater detail about the components and/or modules of each of the aggregator 202 and the customer environment 212, only a single customer environment 212 is shown.

The aggregator 202 can include the fusion manager 302, the protocol manager 304, and the FL connection manager 306. These modules can be modules within and/or accessible and/or controllable by the federation server 204. The fusion manager 302 can be coupled with the model stores, and specifically with the global model store 206 and the local model store 208.

As seen in FIG. 3, the local model store 208 can include a plurality of mini models 308, also referred to herein as supplemental models 308 or as local models 308. These can include a first mini model 308-A received from a first customer environment 212 such as, for example customer environment A 212-A shown in FIG. 2, and a second mini model 308-B received from a second customer environment 212 such as, for example, customer environment B 212-B shown in FIGS. 2 and 3. The local model store 208 can include binary for each of the mini models 308 contained in the local model store 208, which binary can identify layers, nodes, and/or weighting values of the model from which the mini model was created.

As further seen in FIG. 3, the global model store 206 can include the global model 310. The global model 310 can be trained and/or generated by the aggregator 202, and specifically, in some embodiments, by the fusion manager 302.

The fusion manager 302 can select and/or a particular model from one of the model stores 206, 208. In some embodiments, the fusion manager 302 can provide information to, and/or retrieve information from the model stores 206, 208. This can include providing the global model 310 to the global model store 206 and/or one or several of the mini models 308 to the mini model store 208. The fusion manager 302 can, in some embodiments, retrieve models from the model stores 206, 208. This can include retrieving the global model 310 from the global model store 206 to allow the providing of the global model to one or more of the customer environments 212. In some embodiments, this can include retrieving one or several of the mini models 308 from the mini model store 208. These mini models 308 can then be provided to one or move customer environments 212. In some embodiments, the fusion manager 302 can retrieve and/or provide information relating to model performance. Thus, in some embodiments, the fusion manager 302 can access metadata associated with models stored in one of the model stores 206, 208. The fusion manager can be embodied in hardware or software, and can be, in some embodiments, a part of the federation server 204.

The protocol manager 304 facilitates communication between the aggregator 202 and/or the federated server 204 and one or several of the customer environments 212. The protocol manager 304 further can provide governance across message exchange between the customer environments 212 and the aggregator 202 and/or the federated learning server, for example the learning protocols. These messages can include, for example, queries, model updates, establish FL configurations, registration of new customers, or the like.

The FL connection manager 306 can server as a connection interface between the aggregator 202 and the customer environment 212. In some embodiments, the FL connection manager 306 can establish and manage networking between the various components needed for operation of the system 200. Specifically, the FL connection manager can establish and manage communications and/or network between the aggregator 202 and one or several customer environments 212. In some embodiments, the FL connection manager can support low level API's from the OSI/TCP-IP stack.

The customer environment 212 can include a local training manager 312, a protocol manager 314, and a FL connection manager 316. These modules can be modules within and/or accessible and/or controllable by the federation server 204.

The local training manager 312 can train machine learning models in the customer environment 212. This can include training the mini model on top of the global model, and/or training and/or building the fusion model. The local training manager 312 can be communicatingly coupled with the local data manager 318 and the model store 218. The local data manager 318 can be communicatingly coupled with the data store 216. The local data manager 318 can access and provide access to data in the data store 216. This data in the data store 216 of the customer environment 212 can be, in some embodiments, isolated for the particular customer environment 212 in which it is contained.

With access to data in the data store 216, the local training manager 318 can train, generate, and/or build machine learning models. Specifically, the local training manager 318 can train, generate, and/or build the mini model and/or the fusion model. These models can be stored in the model store 218.

Like the aggregator 202, the customer environment 212 can include a protocol manager 314 and a FL connection manager 316. The protocol manager 314 facilitates communication between the customer environment 212 and the aggregator 202. In some embodiments, the protocol manager 314 can further facilitate communication with other customer environments 212. The protocol manager 314 further can provide governance across message exchange between the customer environments 212 and/or between the customer environment and the aggregator 202 and/or the federated learning server 204. These messages can include, for example, queries, model updates, establish FL configurations, registration of new customers, or the like.

The FL connection manager 316 can server as a connection interface between the customer environment 212 and the aggregator 202 and/or between a set of customer environments 212. In some embodiments, the FL connection manager 316 can establish and manage networking between the various components needed for operation of the system 200. Specifically, the FL connection manager can establish and manage communications and/or network between the customer environment 212 and the aggregator 202 and/or between a set of customer environments 212. In some embodiments, the FL connection manager can support low level API's from the OSI/TCP-IP stack.

Figure 4:
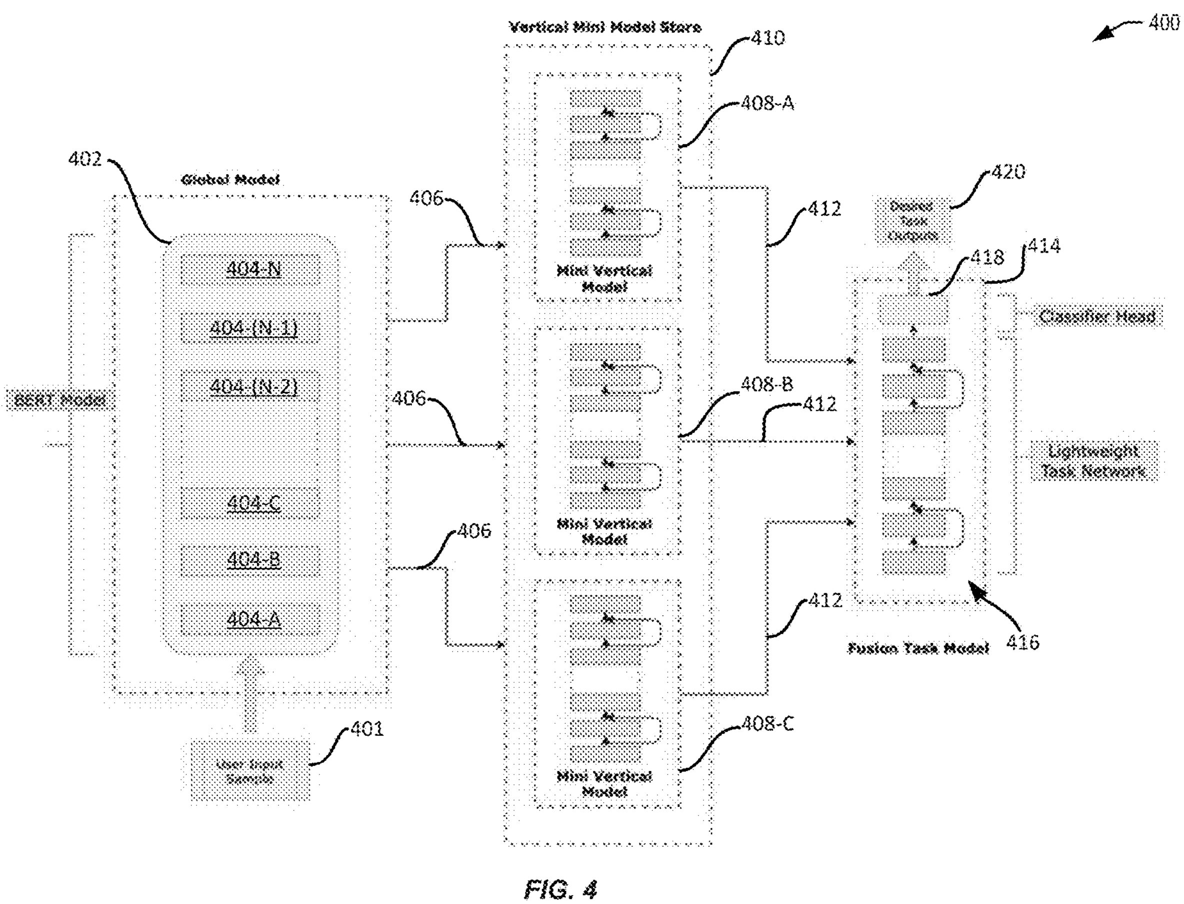
FIG. 4 is a schematic illustration of one embodiment of a process for generating a fusion model output.

With reference now to FIG. 4, a schematic illustration of one embodiment of a process 400 performed by the customer environment in generating a prediction is shown. As seen in FIG. 4, in some embodiments, a prediction can be made utilising a plurality of models. These models can be stored in the customer environment 212. A user input 401 is ingested into a model. In some embodiments, this can include ingesting the user input 401 into the global model 402. The global model 402 can comprise a plurality of layers 404-A through 404-N. In some embodiments, the global model 402 can operate as a feature extractor, and the global model 402 can provide a plurality of outputs 406. As these outputs are used as features by subsequent models, these outputs are referred to herein as intermediate outputs.

In some embodiments, the global model 402 can provide an output after classification and/or processing by some or all of the layers. Thus, for example, the global modal 402 can provide a first output after the processing and/or classification of layer 404-A, a second output after the processing and/or classification of layer 404-B, a third output after the processing and/or classification of layer 404-C, and so on until an Nth output after the processing and/or classification of layer 404-N.

These intermediate outputs 406 can be ingested by a subsequent model such as the mini models or the fusion model. In some embodiments, the mini model(s) and the fusion model are configured to ingest the outputs of the global model, which outputs can comprise layer outputs of at least some of the layers of the global model. In some embodiments, these intermediate outputs 406 can be ingested by one or several mini models 408 stored in a model store 218 of the customer environment 212, and in some embodiments, these intermediate outputs 406 can be ingested by the fusion model 414.

With specific reference to FIG. 4, the intermediate outputs from the global model 402 can be ingested by a plurality of mini models 408 in a model store 218 of the customer environment 212. Each of these mini models 408 can operate as a feature extractor, and can, in some embodiments, provide a plurality of outputs. As these outputs are used as features by subsequent models, these outputs are referred to herein as intermediate outputs.

In some embodiments, the mini models 408 can provide an output 412 after classification and/or processing by some or all of the layers. Specifically, in some embodiments, an output 412 can be provided after the completion of each of some or all of the layers. Thus, in some embodiments, a mini model may provide up to as many outputs 412 as the number of layers in that mini model.

These outputs can be received and ingested into the fusion model 414, which fusion model can comprise a plurality of layers 416 and a classifier head 418. The fusion model 414, and specifically the classifier head can provide a final output in the form of desired task outputs 420.

With reference now to FIG. 5, a flowchart illustrating one embodiment of a process 500 for generating a fusion model is shown. The process 500 can be performed by all or portions of the federated learning system 200. The process 500 begins at block 502, wherein the aggregator 202, and specifically the federated server 204, receives and/or retrieves global training data. In some embodiments, this can include the receiving and/or retrieving the global training data from the global model store 206.

At block 504, the global model is trained. In some embodiments, the global model can be trained by the aggregator 202, and specifically by the federation server 204 and/or by the fusion manager 302. The global model can be trained with the global training data. After the global model has been trained, the global model can be stored in the global model store 206.

At block 506, the global model is provided to customer environments 212. The global model can be provided to the customer environments by the aggregator 202 via the federation server 204, and specifically via the FL connection manager 306 and the protocol manager 304. In some embodiments, the aggregator 202 can send the global model to some or all of the customer environments 212 with which the aggregator is connected. The global model is received by the customer environments 212, and the customer environments 212 store the global model in their model store 218.

At block 508 local data is collected in each of the customer environments 212. Local data gathered by a customer environment 212 can be stored in the data store 216 of that customer environment 212. The local data can be stored in the data store 216 by the local data manager 318 of the customer environment 212.

At block 510, some or all of the customer environments 212 that have received the global model can train a mini model. In some embodiments, this can include the training of the mini model on top of the global model.

The mini model trained by a customer environment 212 can be trained by the local training manager 312 of that customer environment 212. The mini model of a customer environment 212 can be trained with local data of that customer environment 212. This local data can be retrieved from the data store 216 of that customer environment 212 by the local data manager 318 of that customer environment 212. Performing of the step of block 510 by a plurality of customer environments 212 can result in the creation of a plurality of mini models, each of which mini models can be trained with the local data of the customer environment 212 in which the mini model is trained. The mini model generated by a customer environment 212 can be stored in the model store 218 of that customer environment 212.

At block 512, customer environments remove the head layer from their trained mini models to create a stripped mini model. This can include the customer environment 212 removing the classifier head of the mini model of that customer environment 212. In some embodiments, this stripped mini model can comprise binary of the mini model, which binary can, for example, identify the layers and/or the nodes of the supplemental model, and the weights associated with the layers and/or nodes of the supplemental model.

After the head layer of a mini model has been removed, the stripped mini model can be uploaded by the customer environment to the aggregator 202, or in other words, the binary of the mini model can be uploaded. This can include the protocol manager 314 and/or the FL connection manager 316 of the customer environment 212 communicating the stripped mini model to the connection manager 306 and/or the protocol manager 304 of the aggregator 202. The aggregator 202 can receive the stripped mini models from the customer environments 212 and can store the stripped mini models in the global model store 206.

At block 514, the received stripped mini models are evaluated by the aggregator 202. The aggregator 202 can generate mini model scores, and can associated the mini models with their mini model stores. These mini model scores can characterize one or several attributes of the mini model, the training of the mini model, the customer environment 212 that trained the mini model, or the like. In some embodiments, these mini model scores can reflect, for example, a trustworthiness of the associated mini model. In some embodiments, the mini model score of a mini model can be generated based on metadata associated with that mini model.

At block 516, a customer environment selects, fetches, requests, and/or receives one or several stripped mini models from the aggregator. In some embodiments, a customer via a customer environment can request information characterizing one or several stripped mini models. This information can include, for example, the mini model scores, metadata associated with the mini models, or the like. In some embodiments, the customer, via the customer environment can select and/or request one or several mini models. In some embodiments, these one or several mini models can be selected based on this information characterizing the one or several stripped mini models. For example, a customer may select and/or request one or several mini models when the requested one or several mini models have information indicating one or several desired attributes such as, for example, a sufficiently high trustworthiness, training of the mini models for one or several desired tasks, or the like. In some embodiments, the customer can select mini models based on a predetermined threshold, and in some embodiments, the customer can select mini models based on comparison of the received mini models. Thus, in some embodiments, for example, the customer may select mini models having the best scores.

The aggregator 202 can receive selections of and/or requests for stripped mini models and can provide the requested and/or selected mini models to the customer environment 212. The stripped mini models can be provided to the customer environment via the protocol manager 304 and/or the FL connection manager 306. The customer environment 212 can receive the selected stripped mini models from the aggregator 202, and can store the stripped mini models in the model store 218. In some embodiments, the customer environment 212 can receive the stripped mini models via the FL connection manager 316 and/or the protocol manager 314.

At block 518, the customer environment 212 trains a fusion model. In some embodiments, the customer environment 212 can train the fusion model on top of the received, stripped mini models. The fusion model can be trained by the local training manager 312. In some embodiments, the training of the fusion model can include the fusion of the mini models into the fusion model. In some embodiments, the fusion model can comprise: neural networks such as, for example, FedAVG(, Gradient Average, Fed+, FedPox; decision trees such as ID3 fusion; Reinforcement Learning such as Iterative Average, and FedAvg; Linear Classifiers such as Iterative Average; and/or Naïve Bayes such as Naïve Bayes fusion with differential privacy.

In some embodiments, the training of the fusion model can comprise the combining of the binary from each of the received mini models. This fusion training can, in some embodiments, facilitate and ease the creation of the fusion model.

At block 520, a task specific head, and specifically a task specific classifier head is generated and applied to the fusion model. This task specific classifier head can be generated by the customer environment, and specifically can be generated by the local training manager 312. The fusion model can be stored in the model store 218 of the customer environment in which the fusion model was trained and/or generated.

Figure 6:
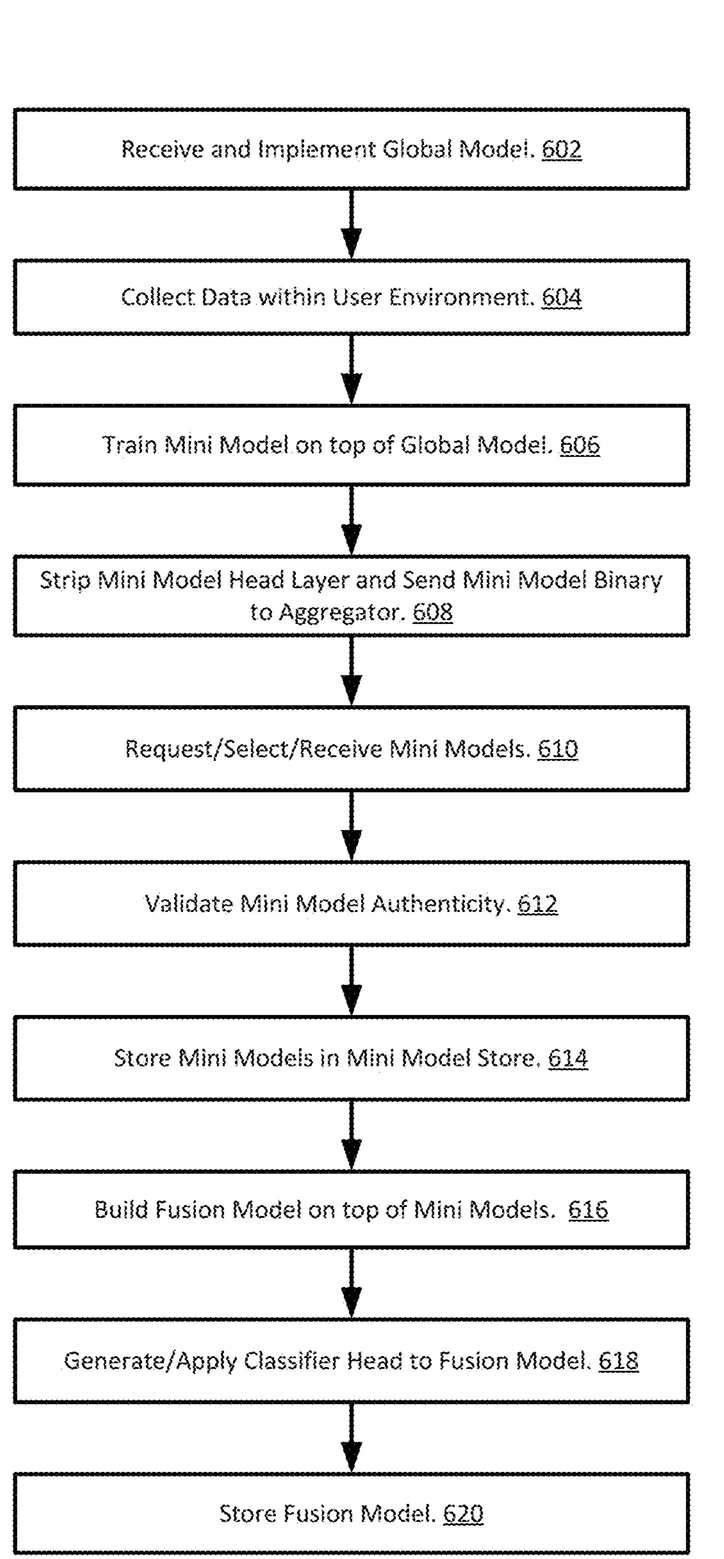
FIG. 6 is a flowchart illustrating one embodiment of a process performed in a customer environment for generating a fusion model.

With reference now to FIG. 6, a flowchart illustrating one embodiment of a process 600 for generating a fusion model is shown. The process 600 can be performed by the customer environment 212. The process 600 begins at block 602, wherein the customer environment 212 receives and implements a global model. The global model can be received by the customer environment 212 from the aggregator. The customer environment 212 can store the global model in the customer environment's model store 218.

At block 604, data is collected with the customer environment 212. This data can comprise local data generated by the customer environment, or in connection with the customer environment. For example, the customer environment 212 may be associated with a hospital. The local data may be some or all of the data generated by or in connection with that hospital. In some embodiments, this data can be provided to, or accessed by the customer environment. The local data collected with the customer environment 212 can be stored in the data store 216 of that customer environment 212 by the local data manager 318.

At block 606 a mini model is trained by the customer environment 212. In some embodiments, the mini model is trained on top of the global model. The mini model trained by the customer environment 212 can specifically be trained by the local training manager 312 of that customer environment 212.

The mini model of a customer environment 212 can be trained with local data of that customer environment 212. This local data can be retrieved from the data store 216 of that customer environment 212 by the local data manager 318 of that customer environment 212. Thus, in some embodiments, training the mini model can include the retrieving of local data from the data store 216 via, for example, the local data manager 318.

At block 608, the mini model head layer is stripped by the customer environment 212, and the stripped mini model, or in other words, the mini model binary is sent and/or provided to the aggregator. In some embodiments, this can include the identification and removal of the head layer from the trained mini model, which head layer can comprise the classifier head. In some embodiments, this stripped mini model can comprise binary of the mini model, which binary can, for example, identify the layers and/or the nodes of the supplemental model, and the weights associated with the layers and/or nodes of the supplemental model.

After the head layer of a mini model has been removed, the stripped mini model can be uploaded by the customer environment to the aggregator 202, or in other words, the binary of the mini model can be uploaded. This can include the protocol manager 314 and/or the FL connection manager 316 of the customer environment 212 communicating the stripped mini model to the connection manager 306 and/or the protocol manager 304 of the aggregator 202. The aggregator 202 can receive the stripped mini models from the customer environments 212 and can store the stripped mini models in the global model store 206.

At block 610, a customer environment selects, fetches, requests, and/or receives one or several stripped mini models from the aggregator. In some embodiments, the distribution of stripped mini models can be according to a push mechanism or according to a pull mechanism. In some embodiments, for example, one or several mini models and/or updates can be pushed by the aggregator 202 to the customer environment 212. In other embodiments, the customer environment 212 may select and/or request one or several mini models.

In embodiments in which mini models are pushed to the customer environment, the aggregator 202 can track the number of received mini models, and changes in the mini models as compared to the global model. In some embodiments, for example, the updates can be pushed by the aggregator when, for example, a predetermined time period has passed or when a threshold of changes has been met.

In embodiments in which mini models are pulled to the customer environment 212, a customer via a customer environment can request information characterizing one or several stripped mini models. This information can include, for example, the mini model scores, metadata associated with the mini models, or the like. In some embodiments, the customer, via the customer environment can select and/or request one or several mini models. In some embodiments, these one or several mini models can be selected based on this information characterizing the one or several stripped mini models. For example, a customer may select and/or request one or several mini models when the requested one or several mini models have information indicating one or several desired attributes such as, for example, a sufficiently high trustworthiness, training of the mini models for one or several desired tasks, or the like. In some embodiments, the customer can select mini models based on a predetermined threshold, and in some embodiments, the customer can select mini models based on comparison of the received mini models. Thus, in some embodiments, for example, the customer may select mini models having the best scores.

The aggregator 202 can receive selections of and/or requests for stripped mini models and can provide the requested and/or selected mini models to the customer environment 212. The stripped mini models can be provided to the customer environment via the protocol manager 304 and/or the FL connection manager 306. The customer environment 212 can receive the selected stripped mini models from the aggregator 202, and can store the stripped mini models in the model store 218. In some embodiments, the customer environment 212 can receive the stripped mini models via the FL connection manager 316 and/or the protocol manager 314.

At block 612, the received stripped mini models are validated for authenticity. In some embodiments, this validation for authenticity can be performed by the customer environment 212. In some embodiments, the validation of authenticity can be performed utilizing an external trust establishment system. This can include, for example, utilizing block chain. In some embodiments, the external trust establishment system can validate authenticity of the received mini models via, for example, distributed consensus.

At block 614, the received mini models and/or updates are stored by the customer environment 212. In some embodiments, this can include storing the received mini models and/or updates in the model store 218.

At block 616, a fusion model is built on top of the received mini models. In some embodiments the fusion model can be created from a combination of the supplemental models and/or the fusion model can be trained on top of the supplemental models. The fusion model can be trained by the local training manager 312. In some embodiments, creating the fusion model based on the received stripped mini models can include combining data, such as the binary of the stripped mini models, representing layers and weights from each of the plurality of mini models.

In some embodiments, the training of the fusion model can include the fusion of the mini models into the fusion model. In some embodiments, the fusion model can comprise: neural networks such as, for example, FedAVG(, Gradient Average, Fed+, FedPox; decision trees such as ID3 fusion; Reinforcement Learning such as Iterative Average, and FedAvg; Linear Classifiers such as Iterative Average; and/or Naïve Bayes such as Naïve Bayes fusion with differential privacy.

At block 618, a task specific head, and specifically a task specific classifier head is generated and applied to the fusion model. This task specific classifier head can be generated by the customer environment, and specifically can be generated by the local training manager 312. The fusion model can be stored in the model store 218 of the customer environment in which the fusion model was trained and/or generated.

At block 620, the fusion model is stored. The fusion model can be stored in the model store 218 of the customer environment in which the fusion model was trained and/or generated.

Figure 7:
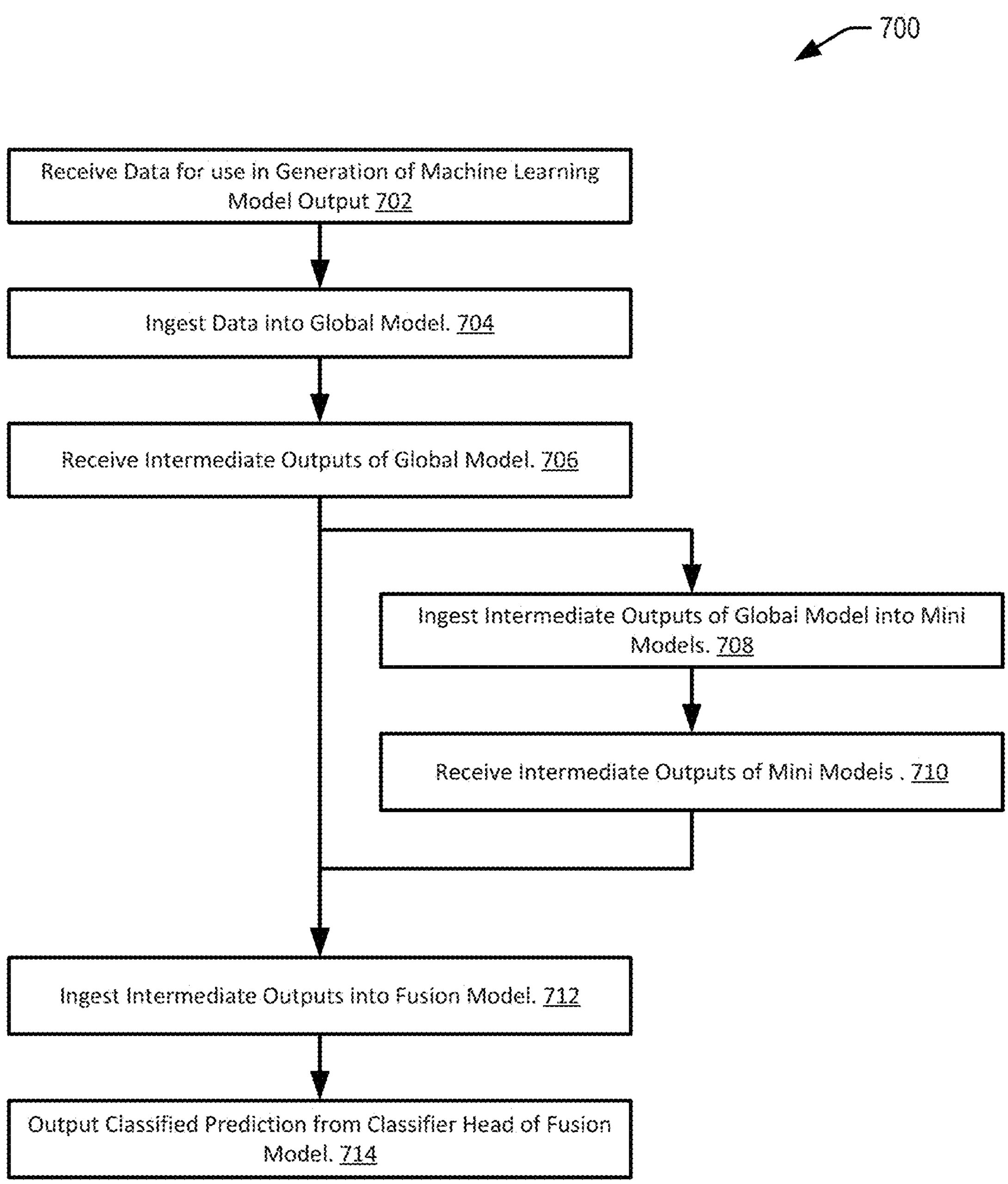
FIG. 7 is a flowchart illustrating one embodiment of a process for generating an output with a fusion model.

With reference now to FIG. 7, a flowchart illustrating one embodiment of a process 700 for generating an output with a fusion model is shown. The process 700 can be performed by a customer environment 212. The process 700 begins at block 702, wherein data for use in generating a machine learning model output, and specifically for generating an output with the fusion model is received. At block 704, this data is ingested into the global model. The global model can generate a plurality of intermediate outputs, also referred to herein a first intermediate outputs, such as, for example, one or several layer outputs. These intermediate outputs of the global model can be received and/or gathered as indicated in block 706.

At block 708, the intermediate outputs of the global model are ingested into the plurality of mini models from which the fusion model was generated. Each of these mini models can generate one or several intermediate outputs, also referred to herein as second intermediate outputs, which can be received and/or gathered as indicated in block 710.

After intermediate outputs have been received and/or gathered from the mini models, the process 700 proceeds to block 712, wherein the intermediate outputs of the mini models and/or of the global model are ingested into the fusion model. In some embodiments in which outputs of the mini models are not desired, steps 708 and 710 can be skipped, and the process can advance directly from block 706 to block 712, wherein the intermediate outputs of the global model are ingested into the fusion model. In some embodiments, in addition to the ingestion of intermediate outputs into the fusion model, some or all of the data received in block 702 can be ingested into the fusion model.

At block 714, the classifier head of the fusion model generates an output and/or makes a prediction based on inputs received from the layers of the fusion model based on the ingested inputs to the fusion model. This can then be output by the fusion model.

Example Implementation

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plan VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
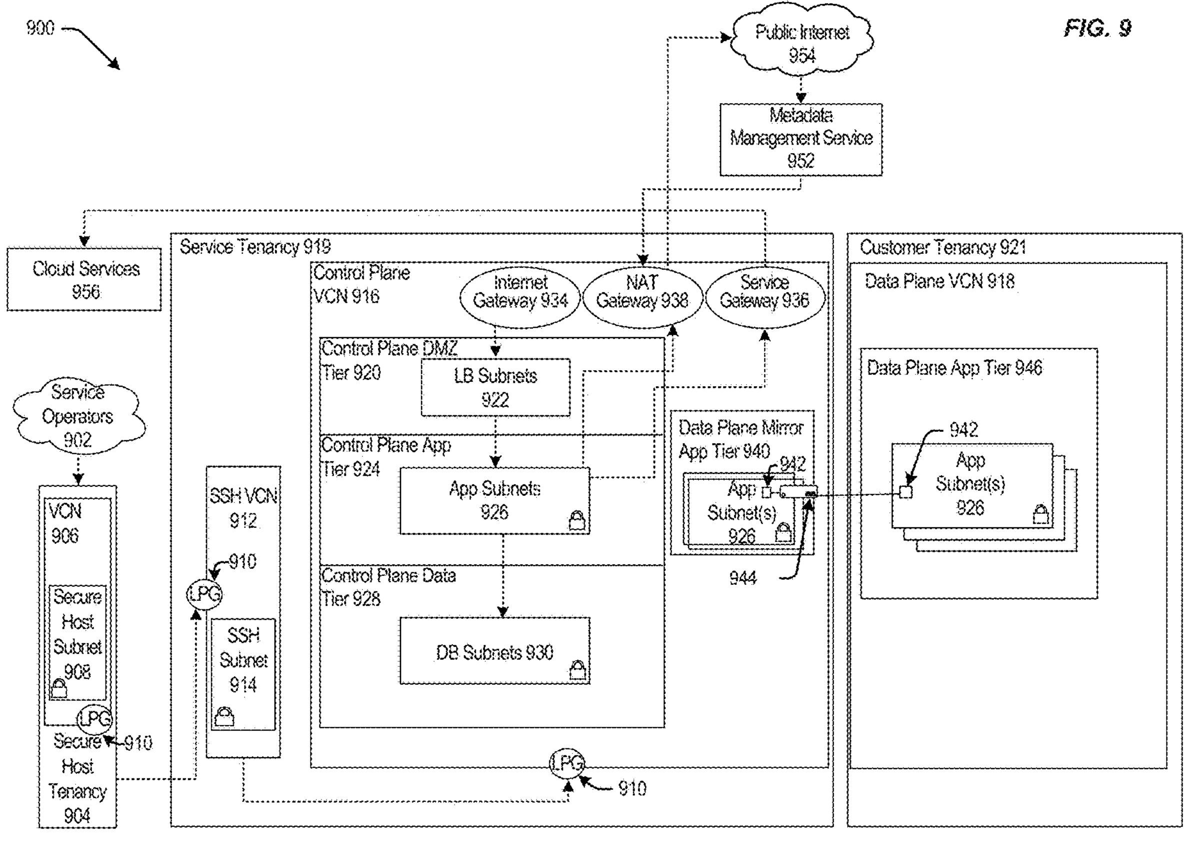
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plan app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 11," may be located in Region 1 and in "Region 2." If a call to Deployment 11 is made by the service gateway 936 contained in the control plane VCN 916 located in Region 1, the call may be transmitted to Deployment 11 in Region 1. In this example, the control plane VCN 916, or Deployment 11 in Region 1, may not be communicatively coupled to, or otherwise in communication with, Deployment 11 in Region 2.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1011 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036

(e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s)

1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
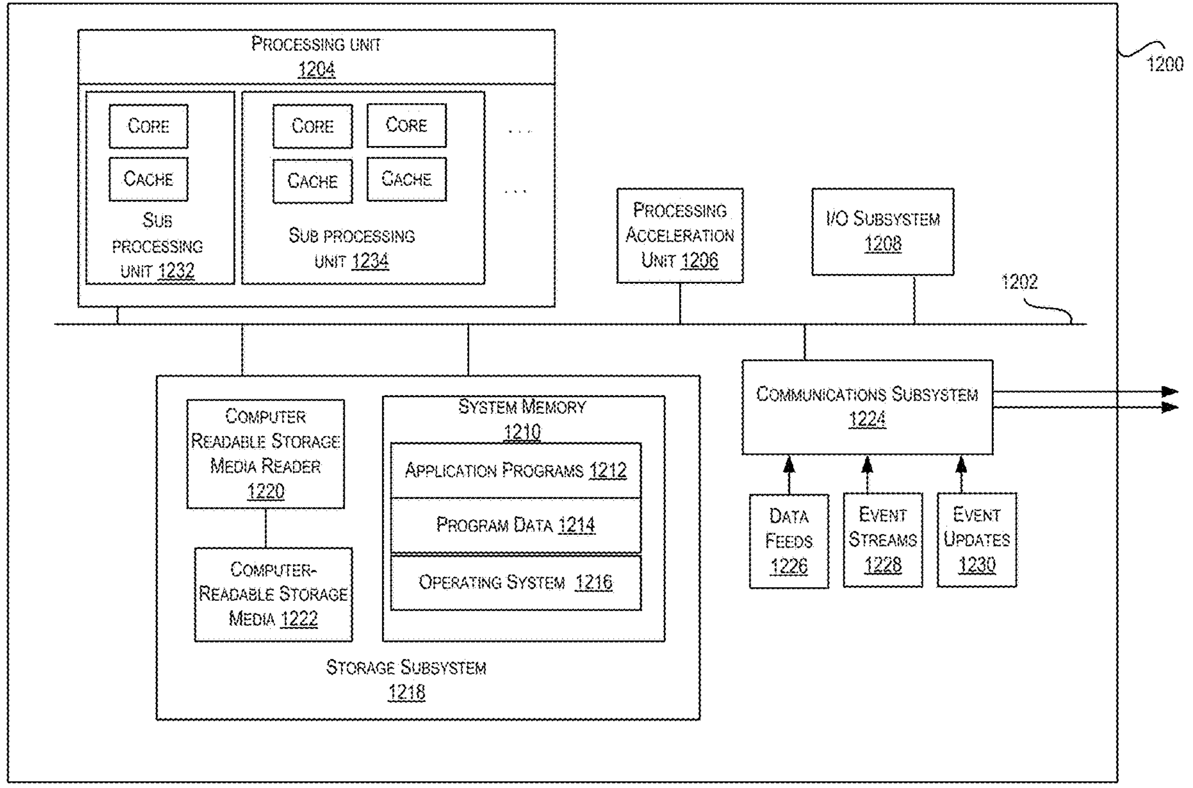
FIG. 12 is a block diagram illustrating an example computer system, according to at least one embodiment.

FIG. 12 illustrates an example computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

What is claimed is:

1. A method comprising:

receiving a global model from a central aggregator communicating with a plurality of user environments, the global model comprising a plurality of layers;

training mini models on top of the global model with data gathered within a user environment of the plurality of user environments, wherein the mini models are supplemental machine learning models comprising binary representing layers, nodes, and/or weights of the mini models;

stripping the mini models of a classifier head;

uploading at least a portion of the mini models comprising the binary to the central aggregator, wherein the mini models that are uploaded are selected based on metadata associated with the mini models;

receiving a plurality of mini models;

creating a fusion model by combining the binary from the received plurality of mini models; and training the fusion model on top of the received stripped plurality of mini models.

2. The method of claim 1, wherein the plurality of user environments comprise a plurality of tenancies within of a cloud computing network.

3. The method of claim 1, wherein the global model comprises a deep-learning model.

4. The method of claim 3, wherein the deep-learning model comprises a transformer.

5. The method of claim 3, wherein the deep-learning model comprises a Bidirectional Encoder Representations from Transformers (BERT) model.

6. The method of claim 1, wherein the mini model is configured to ingest outputs of the global model.

7. The method of claim 6, wherein the outputs of the global model comprise layer outputs of at least some of the layers of the global model.

8. The method of claim 1, wherein uploading the mini model to the central aggregator comprises uploading binary of the mini model.

9. The method of claim 1, wherein the plurality of mini models are received from the central aggregator.

10. The method of claim 1, wherein creating the fusion model based on the received plurality of mini models comprises training the fusion model on top of the received mini models.

11. The method of claim 1, wherein creating the fusion model based on the received plurality of mini models comprises combining data representing layers and weights from each of the plurality of mini models.

12. The method of claim 1, wherein creating the fusion model based on the received plurality of mini models comprises: generating the classifier head; and applying the classifier head to layers of the fusion model.

13. The method of claim 1, further comprising:

receiving data for use in generation of a machine learning model output;

ingesting the data with the global model at the user environment;

gathering intermediate outputs of the global model;

ingesting the intermediate outputs with the fusion model; and outputting a prediction with the fusion model.

14. The method of claim 1, further comprising:

receiving data for use in generation of a machine learning model output;

ingesting the data with the global model at the user environment;

gathering first intermediate outputs of the global model;

ingesting the first intermediate outputs of the global model with at least some of the plurality of mini models;

gathering second intermediate outputs of the at least some of the plurality of mini models;

ingesting the intermediate outputs with the fusion model; and outputting a prediction with the fusion model.

15. A system comprising: memory; and at least one processor configured to: receive a global model from a central aggregator communicating with a plurality of user environments, the global model comprising a plurality of layers;

train mini models on top of the global model with data gathered within a user environment of the plurality of user environments, wherein the mini models are supplemental machine learning models comprising binary representing layers, nodes, and/or weights of the mini model;

stripping the mini models of a classifier head;

upload at least a portion of the mini models comprising the binary to the central aggregator, wherein the mini models that are uploaded are selected based on metadata associated with the mini models receive a plurality of mini models; create a fusion model by combining the binary from the received plurality of mini models; and train the fusion model on top of the received stripped plurality of mini models.

16. The system of claim 15, wherein creating the fusion model based on the received plurality of mini models comprises training the fusion model on top of the received mini models.

17. A non-transitory computer-readable storage medium storing a plurality of instructions executable by one or more processors, the plurality of instructions when executed by the one or more processors cause the one or more processors to: receive a global model from a central aggregator communicating with a plurality of user environments, the global model comprising a plurality of layers;

train mini models on top of the global model with data gathered within a user environment of the plurality of user environments, wherein the mini models are supplemental machine learning models comprising binary representing layers, nodes, and/or weights of the mini model; stripping the mini models of a classifier head; upload at least a portion of the mini models comprising the binary to the central aggregator, wherein the mini models that are uploaded are selected based on metadata associated with the mini models receive a plurality of mini models;

create a fusion model by combining the binary from the received plurality of mini models; and training the fusion model on top of the received stripped plurality of mini models.

18. The non-transitory computer-readable storage medium storing the plurality of instructions executable by the one or more processors of claim 17, wherein creating the fusion model based on the received plurality of mini models comprises training the fusion model on top of the received mini models.

* * * * *